(12) United States Patent
Lee et al.

(10) Patent No.: US 12,043,172 B2
(45) Date of Patent: Jul. 23, 2024

(54) LIGHTING SYSTEM AND CONTROL METHOD USING FLUID

(71) Applicants: HYUNDAI MOTOR COMPANY, Seoul (KR); KIA CORPORATION, Seoul (KR)

(72) Inventors: Sang Shin Lee, Suwon-si (KR); Yun Jee Lee, Seoul (KR); Han Na Cho, Hwaseong-si (KR); Ji Hyun Song, Suwon-si (KR); Kyung Chan Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 706 days.

(21) Appl. No.: 17/337,955

(22) Filed: Jun. 3, 2021

(65) Prior Publication Data

US 2022/0144167 A1 May 12, 2022

(30) Foreign Application Priority Data

Nov. 10, 2020 (KR) .......... 10-2020-0149453

(51) Int. Cl.
| | |
|---|---|
| *B60Q 3/80* | (2017.01) |
| *B60H 1/00* | (2006.01) |
| *B60Q 3/20* | (2017.01) |
| *B60R 16/08* | (2006.01) |

(52) U.S. Cl.
CPC .......... *B60Q 3/80* (2017.02); *B60H 1/00278* (2013.01); *B60Q 3/20* (2017.02); *B60R 16/08* (2013.01); *B60Q 2500/20* (2013.01)

(58) Field of Classification Search
CPC ........ B60Q 3/80; B60Q 3/20; B60Q 2500/20; B60Q 3/70; B60Q 3/60; B60H 1/00278; B60H 1/00385; B60H 1/32331; B60R 16/08; B60W 50/08; F21S 10/002; F21V 5/00; F21V 2200/00; H01M 8/04; F21W 2106/00; F21W 2107/10
See application file for complete search history.

(56) References Cited

U.S. PATENT DOCUMENTS

| | | | | |
|---|---|---|---|---|
| 2014/0226309 A1* | 8/2014 | Rosenthal | ............... | G09F 13/24 |
| | | | | 362/96 |
| 2019/0009710 A1* | 1/2019 | Salter | .................... | B60N 3/104 |

FOREIGN PATENT DOCUMENTS

| | | | | |
|---|---|---|---|---|
| DE | 202015104364 U1 * | 12/2015 | ............... | B60Q 3/51 |
| KR | 200424057 Y1 * | 8/2006 | | |
| KR | 10-1054658 A | 8/2011 | | |

OTHER PUBLICATIONS

Translation of KR200424057Y1, Shinhwa Sub (Year: 2006).*
Translation of DE-202015104364-U1, Heigl (Year: 2015).*

* cited by examiner

*Primary Examiner* — Renan Luque
(74) *Attorney, Agent, or Firm* — Morgan, Lewis & Bockius LLP

(57) ABSTRACT

A lighting system using fluid for a vehicle includes: a first flow path configured in an interior part of the vehicle, and receiving fluid stored in the vehicle and guiding a flow of fluid; a lighting part disposed inside the vehicle to radiate light toward the first flow path; and a controller for receiving state information of the vehicle, and providing the state information of the vehicle to a passenger by controlling the flow of fluid flowing through the first flow path or the lighting part according to the state information.

17 Claims, 8 Drawing Sheets

[FIG. 1]
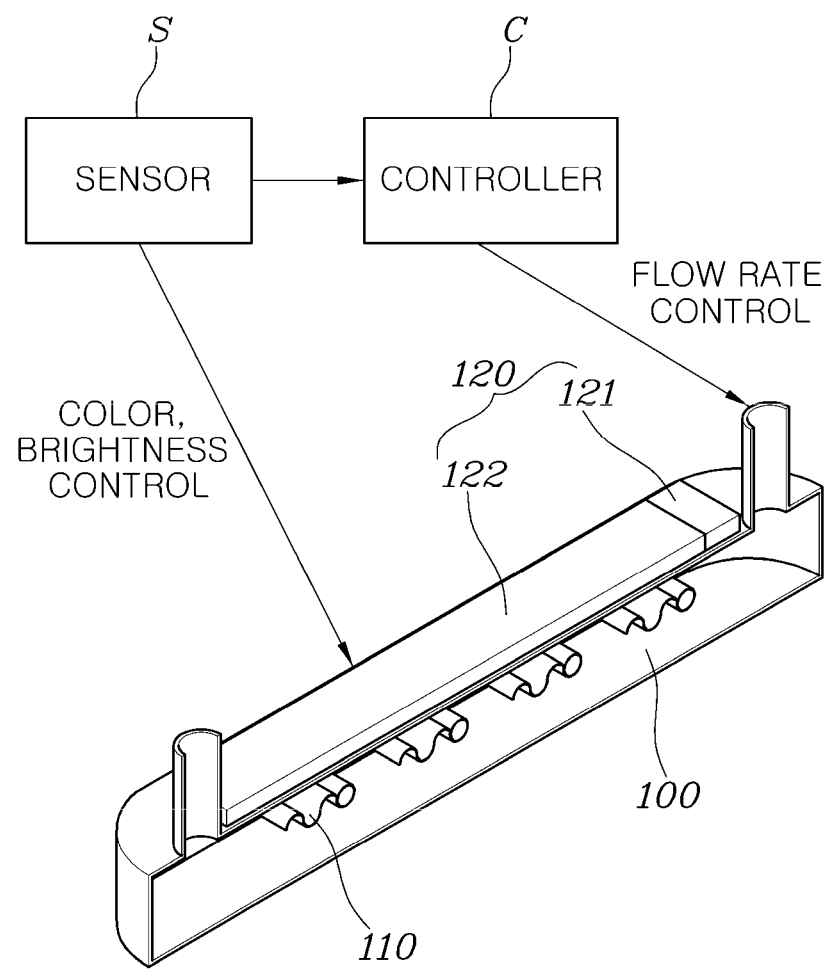

[FIG. 2]
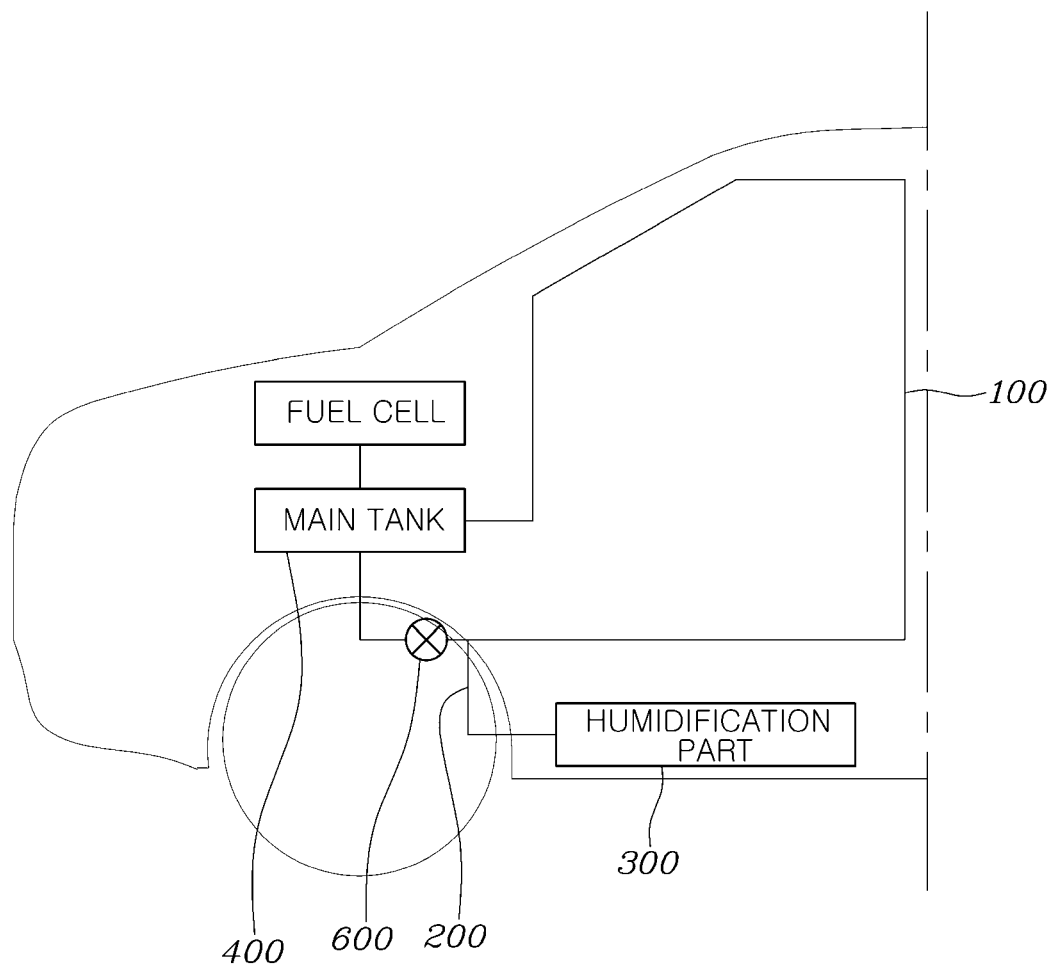

[FIG. 3]
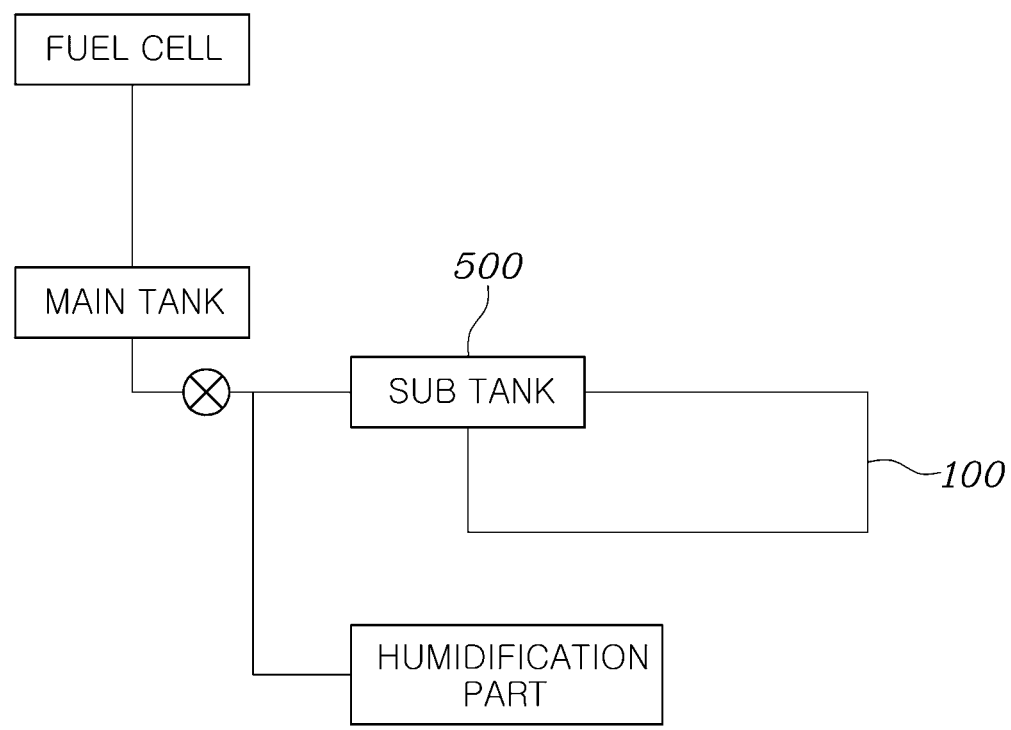

[FIG. 4]
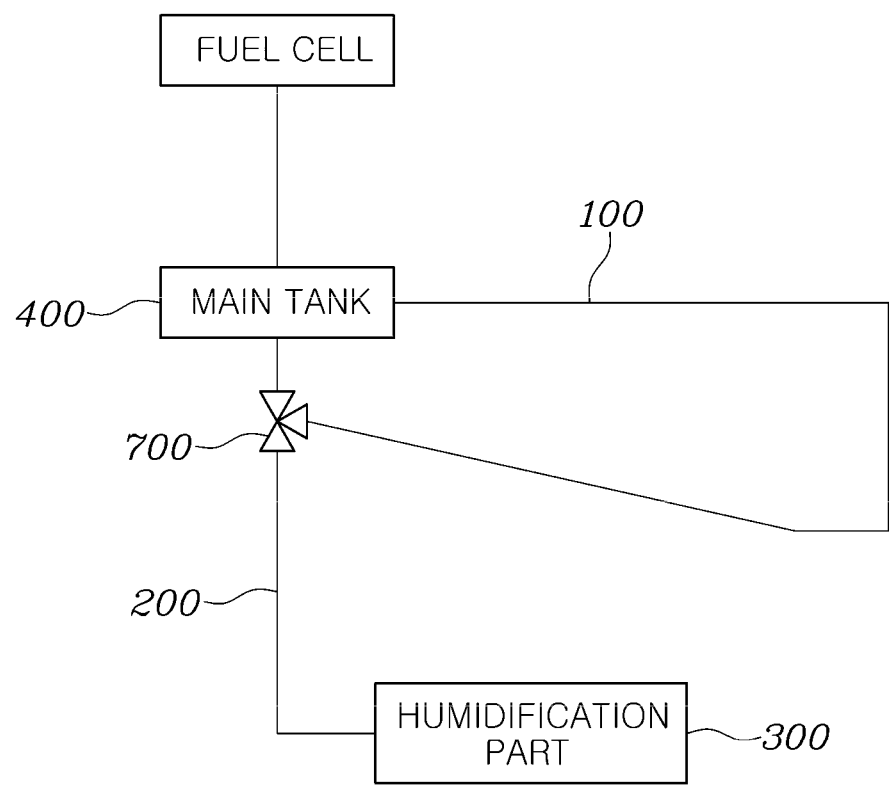

[FIG. 5]
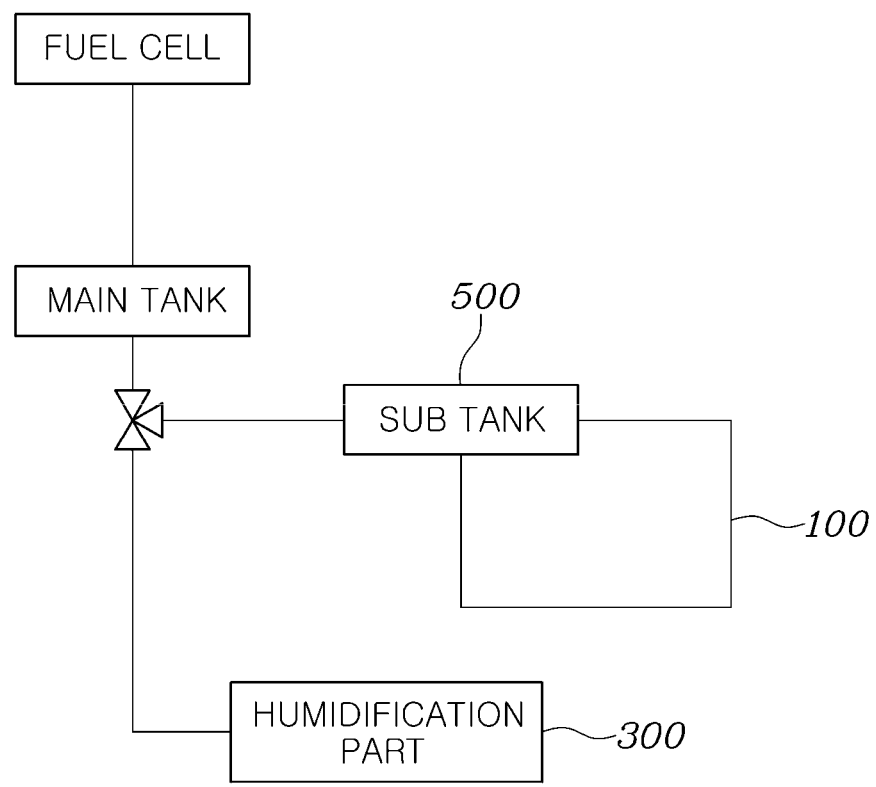

[FIG. 6]
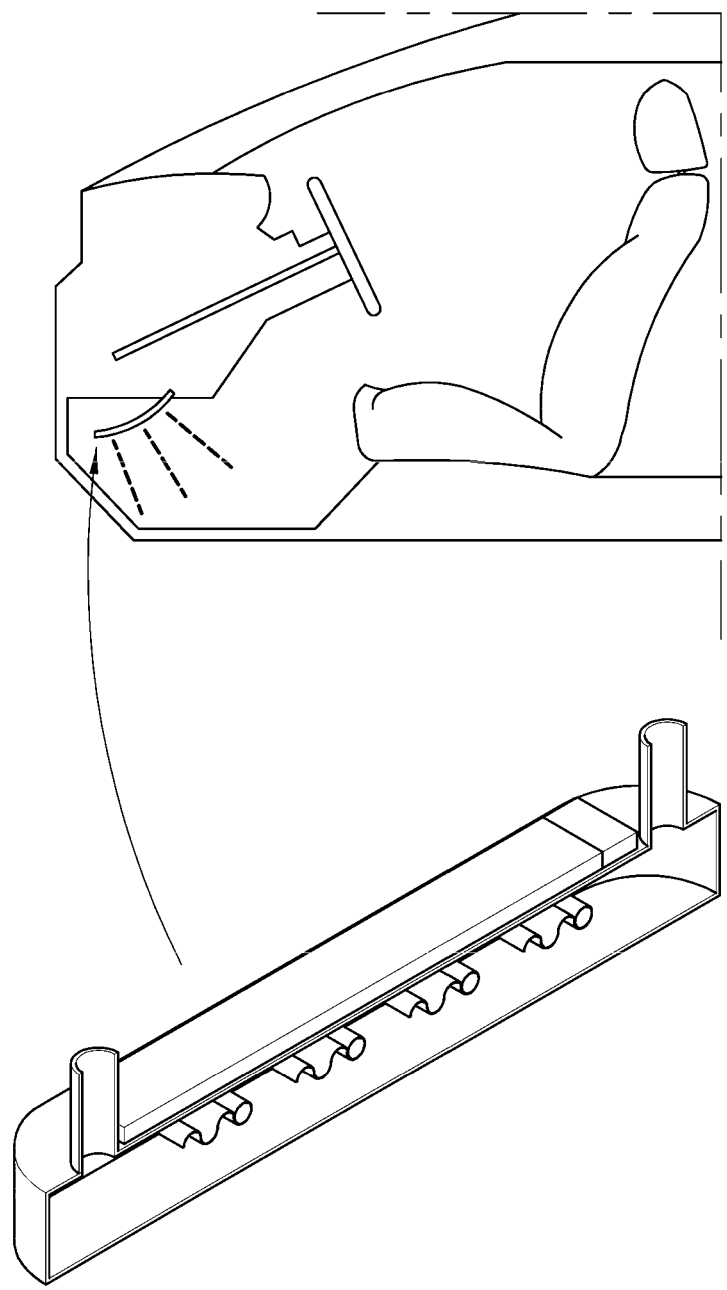

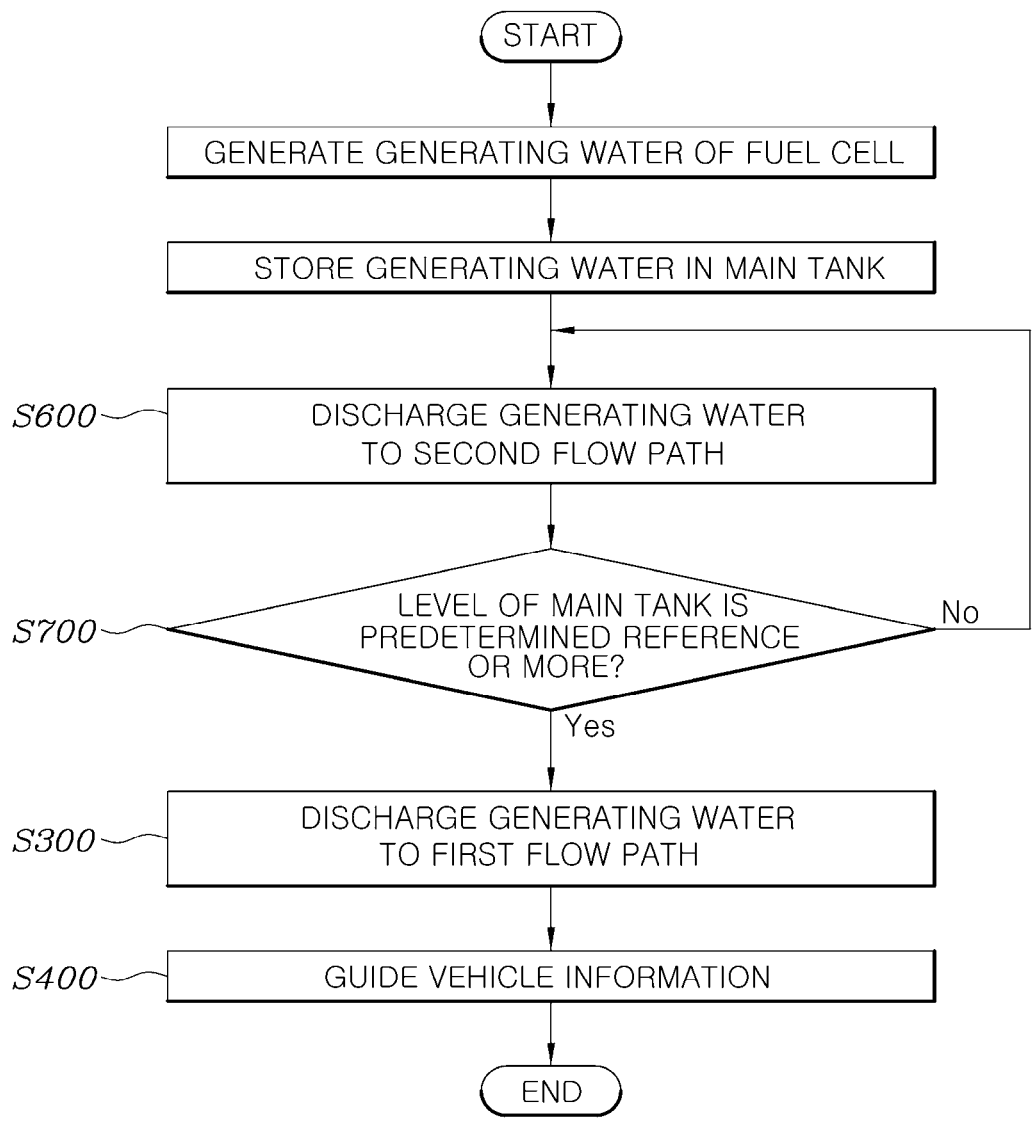
[FIG. 7]

[FIG. 8]
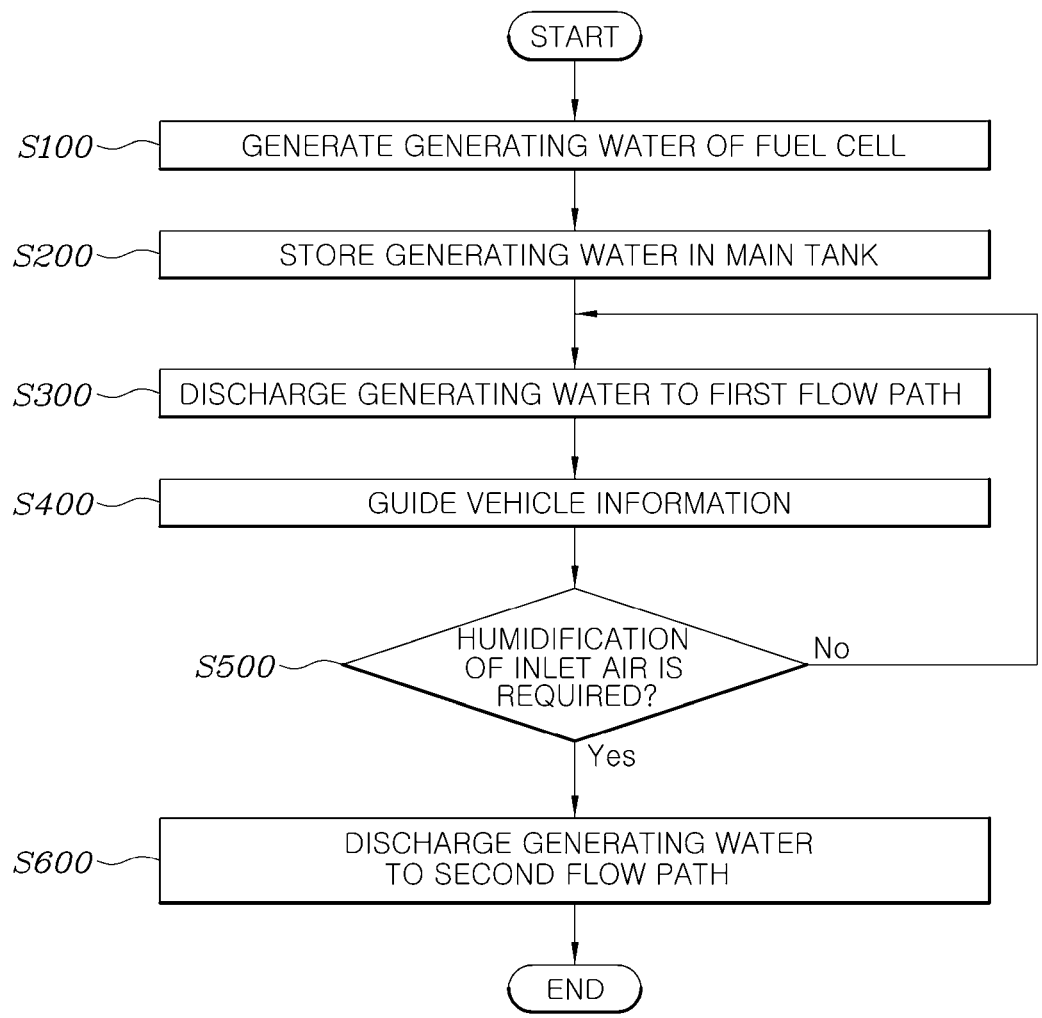

LIGHTING SYSTEM AND CONTROL METHOD USING FLUID

CROSS REFERENCE TO RELATED APPLICATION

The present application claims priority of Korean Patent Application No. 10-2020-0149453 filed on Nov. 10, 2020 in the Korean Intellectual Property Office, the entire contents of which is incorporated herein for all purposes by this reference.

TECHNICAL FIELD

The present disclosure relates to a system and a method for using fluid stored in a vehicle for a vehicle inner lighting.

BACKGROUND

A large amount of greenhouse gases is discharged by the excessive use of the fossil energy, and as the average temperature of the earth increases, extreme weather events have been occurring globally. To prevent the average temperature of the earth from increasing, many countries have joined in Kyoto Protocol and Paris Convention, and the technology for replacing the fossil energy with renewable energy such as wind power, solar energy, waste, or hydrogen is continuously being developed.

Among them, the hydrogen energy is largely in the limelight as the renewable energy because it generates less the greenhouse gas such as $CO_2$ and pollutants such as $NO_x$ and $So_x$ unlike the fossil energy and has a higher energy efficiency than that of the fossil energy.

A hydrogen fuel cell is a device for converting the chemical energy generated by the electrochemical reaction between oxygen ($O_2$) and hydrogen ($H_2$) into the electrical energy to generate power, and generates water ($H_2O$) as a by-product, such that it is the eco-friendly energy.

Generally, fuel cell generating water is discharged to the outside through a discharge system, and methods for using the fuel cell generating water are proposed.

The foregoing explained as the background is intended merely to aid in the understanding of the background of the present disclosure, and is not intended to mean that the present disclosure falls within the purview of the related art that is already known to those skilled in the art.

SUMMARY OF THE DISCLOSURE

The present disclosure is proposed to solve the above problems, and an object of the present disclosure is to use the fuel cell generating water generally discharged inside a fuel cell vehicle, thereby maximizing an eco-friendly image conventionally held by a hydrogen vehicle, and to guide a vehicle state to a passenger using the generating water and the light inside the vehicle, thereby providing the aesthetic sense.

A lighting system using fluid for a vehicle according to an aspect of the present disclosure for achieving the object includes: a first flow path configured in an interior part of the vehicle, and receiving fluid stored in the vehicle and guiding a flow of fluid; a lighting part disposed inside the vehicle to radiate light toward the first flow path; and a controller for receiving state information of the vehicle, and providing the state information of the vehicle to a passenger by controlling the flow of fluid flowing through the first flow path or the lighting part according to the state information.

The fluid stored in the vehicle may be the generating water generated by the fuel cell.

The first flow path may be provided with a scattering device flowing in an inner space, and the scattering device may scatter the light radiated from the lighting part according to the flow.

The scattering device may be a panel installed inside the first flow path through the rotary axis, and the panel may be rotated with respect to the rotary axis by the fluid flowing inside the first flow path and scatter the light radiated from the lighting part.

The lighting part may be installed in parallel with the first flow path, and composed of a light source for radiating the light and a diffusion part, the diffusion part diffusing the light radiated from the light source toward the first flow path.

The lighting system using the fluid may further include: a main tank for storing the generating water generated by the fuel cell; a second flow path for guiding the flow of the generating water discharged from the main tank; and a humidification part for receiving the generating water from the second flow path to humidify the inlet air of the fuel cell.

The first flow path may receive the generating water generated by the fuel cell from the main tank.

The lighting system using the fluid may further include: a valve for distributing the generating water discharged from the main tank to the first flow path or the second flow path.

The valve may be a three-way valve, may preferentially supply the generating water discharged from the main tank to the first flow path, and supply the generating water to the second flow path if the humidification of the inlet air of the fuel cell is required.

The valve may be a three-way valve, may preferentially supply the generating water discharged from the main tank to the second flow path, and supply the generating water to the first flow path if the generating water of a predetermined amount or more is stored in the main tank or the humidification of the inlet air of the fuel cell is not required.

A control method of a lighting system using fluid according to another aspect of the present disclosure includes: transferring the fluid stored in a vehicle to a first flow path installed on an interior part of the vehicle; radiating light toward the first flow path using a lighting part installed inside the vehicle; and receiving, by a controller, the state information of the vehicle, and guiding the state of the vehicle to the passenger by controlling the flow of the fluid flowing through the first flow path or the lighting part according to the state information.

In the transferring of the fluid stored in the vehicle to the first flow path, the fluid may be the generating water generated by the fuel cell.

The guiding of the state of the vehicle may visually guide the state of the vehicle to the passenger by adjusting the flow rate of the fluid discharged or changing the brightness or color of the light radiated by the lighting part, by the controller.

The transferring of the fluid to the first flow path may store the generating water generated by the fuel cell in the main tank and discharge the generating water to the first flow path when the generating water is stored in a main tank by a predetermined level or more.

The method may further include humidifying the inlet air of the fuel cell by a humidification part receiving the generating water discharged from a main tank through a second flow path, the humidification part humidifying the inlet air of the fuel cell.

The generating water may be stored in the main tank and preferentially discharged to the first flow path, and if the generating water of a predetermined level or more is stored in the main tank or the humidification of the inlet air of the fuel cell is required, the generating water may be transferred to the humidification part through the second flow path.

Alternatively, the generating water may be stored in the main tank and preferentially discharged to the humidification part, and if the generating water of a predetermined level is stored in the main tank or the humidification of the inlet air of the fuel cell is not required, the generating water may be transferred to the first flow path.

The lighting system and the control method using the fuel cell generating water according to the present disclosure may use the generating water generated by the fuel cell in the vehicle, thereby maximizing the eco-friendly image of the hydrogen vehicle, and guide the vehicle state through the scattering device flowing along the fluid and the flow rate flowing to the vehicle passenger and the lighting, thereby providing the luxurious and aesthetic sense.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a diagram illustrating a sensor, a controller, a first flow path, and a lighting part of a lighting system using fluid according to an exemplary embodiment of the present disclosure.

FIGS. 2 and 3 are circuit diagrams of the lighting system using fluid according to the exemplary embodiment of the present disclosure.

FIGS. 4 and 5 are circuit diagrams of the lighting system using the fluid further including a sub tank according to the exemplary embodiment of the present disclosure.

FIG. 6 is a diagram illustrating an example of using the lighting system according to the exemplary embodiment of the present disclosure.

FIG. 7 is a flowchart illustrating a lighting priority mode in a control method of the lighting system using the fluid according to the exemplary embodiment of the present disclosure.

FIG. 8 is a flowchart illustrating a humidification priority mode in the control method of the lighting system using the fluid according to the exemplary embodiment of the present disclosure.

DETAILED DESCRIPTION

Specific structural to functional descriptions of the exemplary embodiments of the present disclosure disclosed in the present specification or application are only illustrated for the purpose of describing the exemplary embodiments according to the present disclosure, and the exemplary embodiments according to the present disclosure may be embodied in various forms and it should not be construed that the present disclosure is limited to the exemplary embodiments described in the present specification or application.

Since the embodiments according to the present disclosure may be variously changed and have various forms, specific exemplary embodiments will be illustrated in the drawings and described in detail in the present specification or application. However, this is not intended to limit the exemplary embodiments according to the concept of the present disclosure to a particular disclosed form, and it should be understood that the present disclosure includes all changes, equivalents, and substitutes included in the spirit and technical scope of the present disclosure.

Terms such as first and/or second may be used to describe various components, but the components should not be limited by the terms. The terms are used only for the purpose of distinguishing one component from another, and for example, without departing from the scope according to the concept of the present disclosure, the first component may be named a second component, and similarly, the second component may also be named the first component.

When a component is referred to as being "connected" or "coupled" to another component, the component may be directly connected or coupled to another component, but it should be understood that other components may also be present between the components. On the other hand, when a component is referred to as being "directly connected" or "directly coupled" to another component, it should be understood that there are no other components between the components. Other expressions which describe the relationship between the components, that is, "between" and "immediately between" or "neighboring" and "directly neighboring to" should be interpreted in the same manner.

The terminology used in the present specification is merely for the purpose of describing particular exemplary embodiments, and is not intended to limit the present disclosure. The singular forms may include plural forms unless the contexts clearly indicate the opposite. In the present specification, it may be understood that the term "comprising", "having", or the like specifies the presence of the characteristic, integer, step, operation, component, part, or a combination thereof described, and does not exclude the presence or addition possibility of one or more other characteristics, integers, steps, operations, components, parts or combinations thereof in advance.

Unless defined otherwise, all terms including technical terms or scientific terms used herein have the same meaning as commonly understood by those skilled in the art to which the present disclosure pertains. The terms defined in the dictionary commonly used may be interpreted as having a meaning consistent with the meaning in the context of the related technology, and may not be interpreted as an ideal or excessively formal meaning, unless clearly defined in the present application.

Hereinafter, the present disclosure will be described in detail by describing the preferred exemplary embodiment of the present disclosure with reference to the accompanying drawings. The same reference numerals indicated in each drawing refer to the same members.

FIG. 1 is a diagram illustrating a sensor, a controller, a first flow path, and a lighting part of a lighting system using fluid according to an exemplary embodiment of the present disclosure.

FIGS. 2 and 3 are circuit diagrams of the lighting system using fluid according to the exemplary embodiment of the present disclosure.

FIGS. 4 and 5 are circuit diagrams of the lighting system using the fluid further including a sub tank according to the exemplary embodiment of the present disclosure.

FIG. 6 is a diagram illustrating an example of using the lighting system according to the exemplary embodiment of the present disclosure.

FIG. 7 is a flowchart illustrating a lighting priority mode in a control method of the lighting system using the fluid according to the exemplary embodiment of the present disclosure.

FIG. 8 is a flowchart illustrating a humidification priority mode in the control method of the lighting system using the fluid according to the exemplary embodiment of the present disclosure.

FIG. 1 is a diagram illustrating a sensor, a controller, a first flow path, and a lighting part of a lighting system using fluid according to an exemplary embodiment of the present disclosure. Referring to FIG. 1, a lighting system using fluid according to the present disclosure includes a first flow path 100 installed on an interior part of a vehicle, and receiving a fluid stored in the vehicle and guiding the flow of the fluid; a lighting part 120 installed in the vehicle to radiate the light toward the first flow path 100; and a controller C for receiving the state information of the vehicle, and controlling the flow of the fluid flowing through the first flow path 100 or the lighting part 120 according to the state information to provide the state of the vehicle to the passenger.

Specifically, the fluid stored in the vehicle is pressed and discharged by an electric water pump (EWP) which is controlled by the controller C, and the flow rate at which the fluid is discharged to the first flow path 100 is adjusted according to the state information of the vehicle received by the controller C.

The first flow path 100 is provided with a scattering device 110 flowing in the inner space, and the scattering device 110 may scatter the light radiated from the lighting part 120 according to the flow.

The scattering device 110 is a panel installed through the rotary axis inside the first flow path 100, and the panel may be rotated with respect to the rotary axis by the generating water flowing into the first flow path 100 to scatter the light radiated from the lighting part 120.

Therefore, the scattering device 110 may have different degrees of the rotation according to the flow rate of the generating water. When the flow rate of the generating water is slower than a desired rate, the scattering device 110 is moved and rotated in the state of being not largely changed from the initial state, and when the flow rate of the generating water is faster than the desired rate, the scattering device 110 will be quickly moved and rotated by the flow of the generating water. Furthermore, since the scattering device 110 shows different movements according to the flow rate of the generating water, various light scattering states may be generated, thereby diversifying the expressible visual effect and intuitively guiding the state information of the vehicle to the passenger.

The lighting part 120 is installed in parallel to the first flow path 100, and is composed of a light source 121 for radiating light and a diffusion part 122, in which the diffusion part 122 may diffuse the light radiated from the light source 121 toward the first flow path 100.

Specifically, the light source 121 of the lighting part 120 may directly radiate the light toward the first flow path 100, but the light source 121 may preferentially radiate the light to the diffusion part 122 and the light reflected by the diffusion part 122 may be radiated toward the first flow path 100. Therefore, the light is reflected from the diffusion part 122 and the light is radiated toward the first flow path 100, thereby obtaining more colorful lighting effect than in the case of directly radiating the light to the first flow path 100.

FIGS. 2 and 3 are circuit diagrams of the lighting system using the fluid according to the exemplary embodiment of the present disclosure. The present disclosure will be described with reference to FIGS. 2 and 3.

The fluid stored in the vehicle may be the generating water generated by a fuel cell. That is, the fluid may be water generated as a by-product by generating electrical energy in the power-generating process of a hydrogen fuel cell.

The lighting system using the fluid may further include a main tank 400 for storing the generating water generated by the fuel cell; a second flow path 200 for guiding the flow of the generating water discharged from the main tank; and a humidification part 300 for humidifying the inlet air of the fuel cell by receiving the generating water from the second flow path. 200

Referring to FIGS. 2 and 3, the humidification part 300 may be located in a space such as an engine room of the vehicle, that is, the fuel cell, the main tank, or the lower space, and the first flow path 100 is installed on the interior part of the vehicle. Like the first flow path 100, the lighting part 120 is installed on the interior part of the vehicle in parallel along the first flow path 100.

Specifically, the main tank 400 is a space storing the generating water discharged to the first flow path 100 and the second flow path, and the generating water discharged to the first flow path 100 and the second flow path is pressed and discharged by the EWP.

Since the air supplied to the fuel cell should sufficiently include humidity in order for the fuel cell to stably generate energy, the humidification device is required, and to humidify the inlet air, the lighting system using the fluid may further include the humidification part 300, and the second flow path 200 connecting the humidification part 300 to the main tank.

The first flow path 100 may receive the generating water generated by the fuel cell from the main tank.

The lighting system using the fluid may further include a valve for distributing the generating water discharged from the main tank to the first flow path 100 or the second flow path 200.

Specifically, the valve may be an ON/OFF valve 600 or a three-way valve 700. The case of using the ON/OFF valve is a method for not prioritizing the generating water discharged to the first flow path 100 and the second flow path 200. As illustrated in FIG. 2, if the ON/OFF valve is located between the main tank and the line being distributed to the first flow path and the second flow path, when the valve is opened, the generating water is discharged to all of the first flow path 100 and the second flow path 200. In the case of using the ON/OFF valve, it is possible to save the cost of the system.

Further, the valve may be the three-way valve, may preferentially supply the generating water discharged from the main tank to the first flow path, and supply the generating water to the second flow path if the humidification of the inlet air of the fuel cell is required.

Alternatively, on the contrary, the valve may preferentially supply the generating water discharged from the main tank to the second flow path, and supply the generating water to the first flow path if the generating water is stored in the main tank by a predetermined amount or more or the humidification of the inlet air of the fuel cell is not required.

Therefore, the three-way valve may supply the generating water to only one flow path, or supply the generating water to all of two flow paths. In the case of using the three-way valve, the lighting priority mode or the humidification priority mode may be selected, and furthermore, the generating water may also be simultaneously supplied to two flow paths, such that all of two modes may be simultaneously operated.

The lighting system using the fluid may include the sub tank 500 capable of storing the generating water discharged to the first flow path separately from the main tank.

FIGS. 4 and 5 are circuit diagrams of the lighting system using the fluid further including the sub tank according to the exemplary embodiment of the present disclosure.

Referring to FIGS. 4 and 5, the sub tank 500 may be further added to the lighting system using the fluid in order to store the generating water received from the main tank 400 and discharge the generating water to the first flow path. Therefore, the control of the first flow path 100 is independently possible regardless of an amount of water stored in the main tank 400 and the humidification part 300.

FIG. 6 is a diagram illustrating an example of using the lighting system according to the exemplary embodiment of the present disclosure. Describing an example of using the lighting system with reference to FIG. 6, the first flow path is mainly installed on an instrument panel guiding the information of the vehicle, a window frame, or the upper portion of the vehicle. However, the first flow path may be installed anywhere if it is a place in which the user may easily get the information about the vehicle state inside the vehicle. FIG. 6 illustrates an exemplary embodiment in which the first flow path is located on the lower portion of the vehicle to guide the state information of the vehicle to the driver. Even if the lower portion of the vehicle is a portion in which it is hard for the driver to have the attention, it is preferable to provide simple or intuitive information in the lower portion of the vehicle such that the driver of the vehicle may get the state information of the vehicle just by looking out of the corner of his/her eye. For example, when the current battery capacity of the hydrogen fuel cell of the vehicle is 70% or more, only the last bar of three battery bars is flashed; when the current battery capacity thereof is 30% or more, only the last bar of two battery bars is flashed; and when the current battery capacity thereof is less than 30%, one battery bar is flashed, thereby guiding the information about the battery state.

FIG. 7 is a flowchart illustrating a lighting priority mode of a control method of the lighting system using the fluid according to the exemplary embodiment of the present disclosure, and FIG. 8 is a flowchart illustrating a humidification priority mode of the control method of the lighting system using the fluid according to the exemplary embodiment of the present disclosure. A control method of the lighting system using the fluid according to the present disclosure for achieving the object will be described with reference to FIGS. 7 and 8.

The control method of the lighting system using the fluid includes transferring the fluid (may be the generating water generated by a fuel cell, as the exemplary embodiment) stored in a vehicle to the first flow path installed on the interior part of the vehicle (S300); radiating light toward the first flow path using the lighting part installed within the vehicle; and receiving, by a controller, the state information of the vehicle and guiding the state of the vehicle to the passenger by controlling the flow of the fluid flowing through the first flow path or the lighting part according to the state information (S400).

Specifically, the fluid stored in the vehicle may be water generated as a by-product in the power-generating process of the fuel cell, and based on the above, referring to FIGS. 7 and 8, the discharging of the generated generating water to the first flow path (S300) is performed after generating the generating water of the fuel cell (S100) by operating the vehicle, and the guiding of the state of the vehicle according to the information transmitted by the controller (S400) is performed.

More specifically, the controller receives the information about the current state of the vehicle from a sensor and guides the information about the current state of the vehicle to the passenger based on the received information. In more detail, the controller may visually guide the state of the vehicle to the passenger by adjusting the flow rate of the generating water discharged to the first flow path or changing the brightness or color of the light radiated by the lighting part.

For example, in the state where the current air of the vehicle is so hot, such that a cold wind is quickly discharged from an air-conditioning system, the controller increases the speed of the generating water discharged to the first flow path and increases the flow rate, and the color of the light radiated by the lighting part may use the blue series to transfer the intuitive air-conditioning state of the vehicle or the like to the user.

Further, if the driver drives over the speed limit in the speed limit zone, the controller controls the lighting part such that the light of the red series is repetitively turned on and turned off, thereby alerting the driver.

Other than the above information, the current battery state of the vehicle, the traveling model, and the like may be expressed visually.

Further, the transferring of the generating water to the first flow path (S300) may perform discharging the generating water to the first flow path if the generating water is stored by a predetermined level or more, after storing the generating water generated by the fuel cell in the main tank (S200) is first performed and measuring the level of the generating water by a sensor measuring the level of the generating water inside the main tank (S700) is performed.

The control method may further include humidifying the inlet air of the fuel cell by a humidification part receiving the generating water discharged from the main tank through the second flow path, the humidification part humidifying the inlet air of the fuel cell (S600).

Specifically, when it is recognized that the humidification of the inlet air supplied to the fuel cell from the sensor performing the measuring of the humidification of the inlet air supplied to the fuel cell (S500) is required, the control method may further include humidifying the inlet air dried by the humidification part using the generating water stored in the main tank (S600).

Describing the lighting priority mode with reference to FIG. 7, in some cases, the generating water is stored in the main tank and preferentially discharged to the first flow path, and if the generating water of a predetermined level or more is stored in the main tank or the humidification of the inlet air of the fuel cell is required, the control method may include transferring the generating water to the humidification part through the second flow path.

Fuel cells generate electric current and water through the combination of oxygen and hydrogen in the air. Maintaining a constant humidity in the separator inside the fuel cell is helpful for the efficiency and durability of the fuel cell. Therefore, the fuel cell performs power generation using air that has been humidified through a humidifier. To this end, a humidity sensor is installed inside the fuel cell or in the air inlet to control the humidity of the supplied air.

Specifically, the three-way valve may be provided on the flow path such that the generating water may be selectively discharged to the first flow path or the second flow path. The situation where the generating water is preferentially discharged to the first flow path will become the situation where the humidity of the inlet air introduced into the fuel cell is sufficient, such that the humidification is not separately required, and in that case, the generated generating water may be used to guide the state information of the vehicle, and if the generating water of a predetermined level is stored in the main tank or it is recognized that the humidification of the inlet air is required, the generating water may be transferred to the humidification part through the second flow path.

Unlike the above, describing the humidification priority mode with reference to FIG. 8, the generating water is stored in the main tank and preferentially discharged to the humidification part, and if the generating water of a predetermined level is stored in the main tank or the humidification of the inlet air of the fuel cell is not required, the generating water may be discharged to the first flow path.

Specifically, the three-way valve may be provided on the flow path such that the generating water may be selectively discharged to the first flow path or the second flow path. The situation where the generating water is preferentially discharged to the second flow path will become the situation where the humidity of the inlet air introduced into the fuel cell is not sufficient and the humidification is required, and in that case, the generated generating water may be used to humidify the inlet air introduced into the fuel cell. Thereafter, when the humidity of the inlet air is sufficient or the level of the main tank is a predetermined level or more, the generating water may be discharged to the first flow path.

When the sufficient generating water is generated by the fuel cell, the generating water may be discharged to all of the first flow path and the second flow path to perform all of the operation of guiding the vehicle information and the operation of humidifying the inlet air.

While the specific exemplary embodiment of the present disclosure has been illustrated and described, it will be apparent to those skilled in the art that the present disclosure may be variously improved and changed without departing from the technical spirit of the present disclosure provided by the appended claims.

What is claimed is:

1. A lighting system using fluid for a vehicle, the lighting system comprising:
    a first flow path configured in an interior part of the vehicle, the first flow path configured to receive fluid stored in the vehicle and guide a flow of fluid;
    a lighting part disposed inside the vehicle, having a configuration to radiate light toward the first flow path; and
    a controller for receiving state information of the vehicle, and providing the state information of the vehicle to a passenger by controlling the flow of fluid flowing through the first flow path or the lighting part according to the state information.

2. The lighting system according to claim 1, wherein the first flow path has a scattering device configured to flow in an inner space of the first flow path, and
    wherein the scattering device is configured to scatter light radiated from the lighting part according to a flow motion of the scattering device.

3. The lighting system according to claim 2, wherein the scattering device has a panel shape and rotatably disposed inside the first flow path about a rotary axis, and
    wherein the panel is configured to rotate with respect to the rotary axis by fluid flowing inside the first flow path and to scatter light radiated from the lighting part.

4. The lighting system according to claim 1, wherein the lighting part is arranged in parallel with the first flow path and includes:
    a light source for radiating light; and
    a diffusion part for diffusing light radiated from the light source toward the first flow path.

5. The lighting system according to claim 1, wherein fluid stored in the vehicle is water generated by a fuel cell.

6. The lighting system according to claim 5, further comprising:
    a main tank for storing the water generated by the fuel cell;
    a second flow path configured to guide a flow of the water generated by the fuel cell and then discharged from the main tank; and
    a humidification part for receiving the water from the second flow path and configured to humidify an inlet air of the fuel cell.

7. The lighting system according to claim 6, wherein the first flow path receives the water generated by the fuel cell from the main tank.

8. The lighting system according to claim 6, further comprising a valve configured to be selectively open and close for distributing the water discharged from the main tank to the first flow path or the second flow path.

9. The lighting system according to claim 8, wherein, when the humidification of the inlet air of the fuel cell is required and the valve is a three-way valve, the valve is controlled to be selectively open and close to supply the water discharged from the main tank to the first flow path and then to supply the water to the second flow path.

10. The lighting system according to claim 8,
    wherein, when the water of a predetermined amount or more is stored in the main tank or the humidification of the inlet air of the fuel cell is not required and the valve is controlled to be selectively open and closed to supply the water discharged from the main tank to the second flow path, and then to supply the water to the first flow path.

11. A control method of a lighting system using fluid for a vehicle, the method comprising:
    transferring fluid stored in the vehicle to a first flow path configured in an interior part of the vehicle;
    radiating light toward the first flow path using a lighting part disposed inside the vehicle;
    receiving, by a controller, state information of the vehicle; and
    providing the state information of the vehicle to a passenger by controlling a flow of fluid flowing through the first flow path or the lighting part according to the state information.

12. The method according to claim 11, wherein the providing the state information of the vehicle includes visually providing the state information to the passenger by adjusting a flow rate of fluid discharged or changing a brightness or color of light radiated by the lighting part, by the controller.

13. The method according to claim 11, wherein fluid stored in the vehicle to the first flow path is water generated by a fuel cell.

14. The method according to claim 13, wherein the transferring fluid to the first flow path includes, in a case in which the water of a predetermined level or more is stored in the main tank, storing the water generated by the fuel cell in a main tank of the lighting system and discharging the water to the first flow path.

15. The method according to claim 13, further comprising humidifying inlet air of the fuel cell by a humidification part which receives the water discharged from a main tank through a second flow path.

16. The method according to claim 15, the storing the water generated by the fuel cell includes, in a case in which the water of a predetermined level or more is stored in the main tank or humidification of the inlet air of the fuel cell is required, discharging the water to the first flow path and then transferring the water to the humidification part through the second flow path.

17. The method according to claim 15, wherein the storing the water generated by the fuel cell includes, in a case in which the water of a predetermined level in the main tank or the humidification of the inlet air of the fuel cell is not required, discharging the water to the humidification part and then discharging to the first flow path.

* * * * *

UNITED STATES PATENT AND TRADEMARK OFFICE
CERTIFICATE OF CORRECTION

PATENT NO. : 12,043,172 B2  
APPLICATION NO. : 17/337955  
DATED : July 23, 2024  
INVENTOR(S) : Sang Shin Lee et al.

Page 1 of 1

It is certified that error appears in the above-identified patent and that said Letters Patent is hereby corrected as shown below:

On the Title Page

Column 1, Item (73), replace the present listing with the following:
-- (73) Hyundai Motor Company, Seoul (KR); Kia Corporation, Seoul (KR) --

Signed and Sealed this
Nineteenth Day of August, 2025

Coke Morgan Stewart
*Acting Director of the United States Patent and Trademark Office*